April 14, 1964   F. H. TENNIS   3,128,677
CONTROL INSTRUMENTALITY HAVING DETENT MECHANISM
Filed April 30, 1962   7 Sheets-Sheet 1

Inventor
Francis H. Tennis
By
Attorney

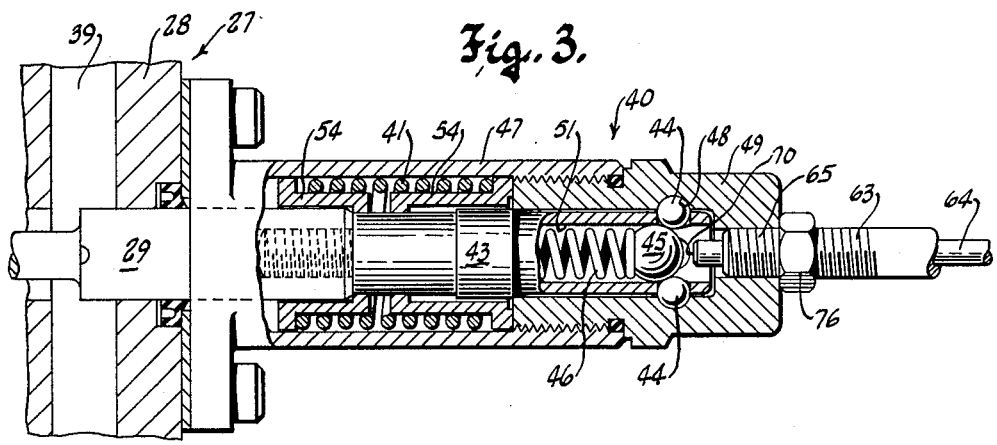
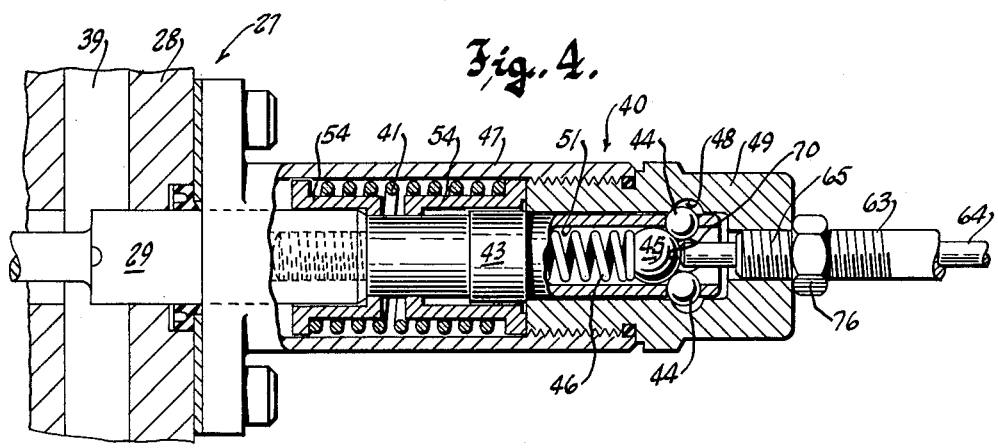
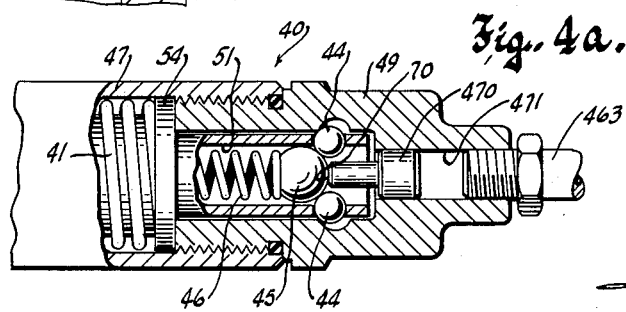

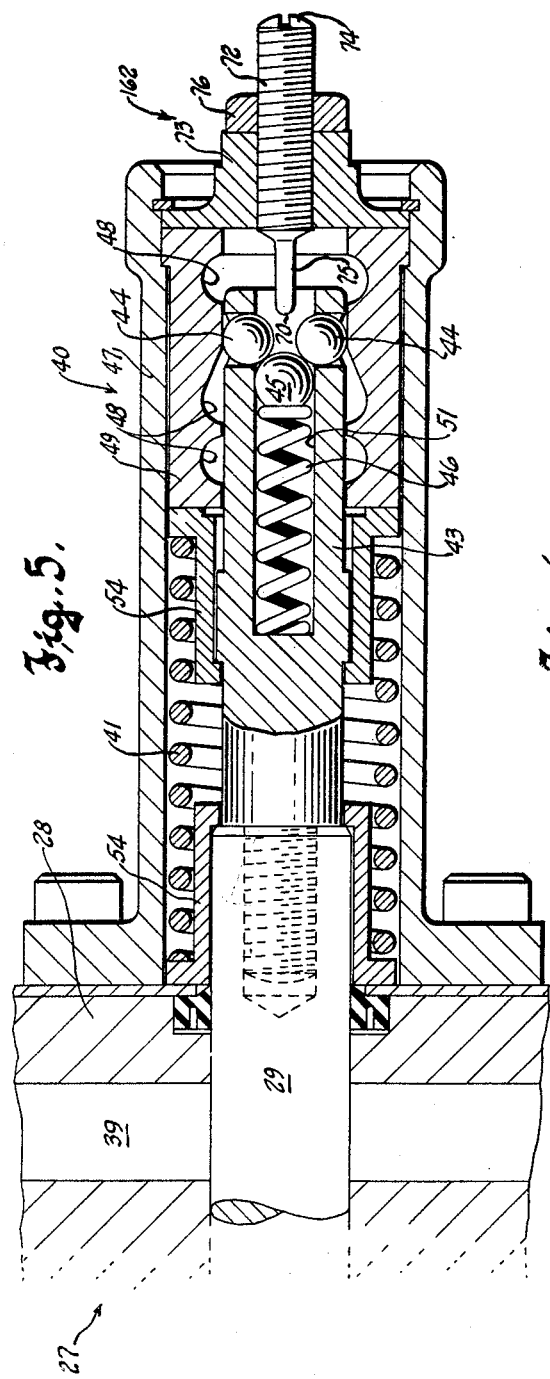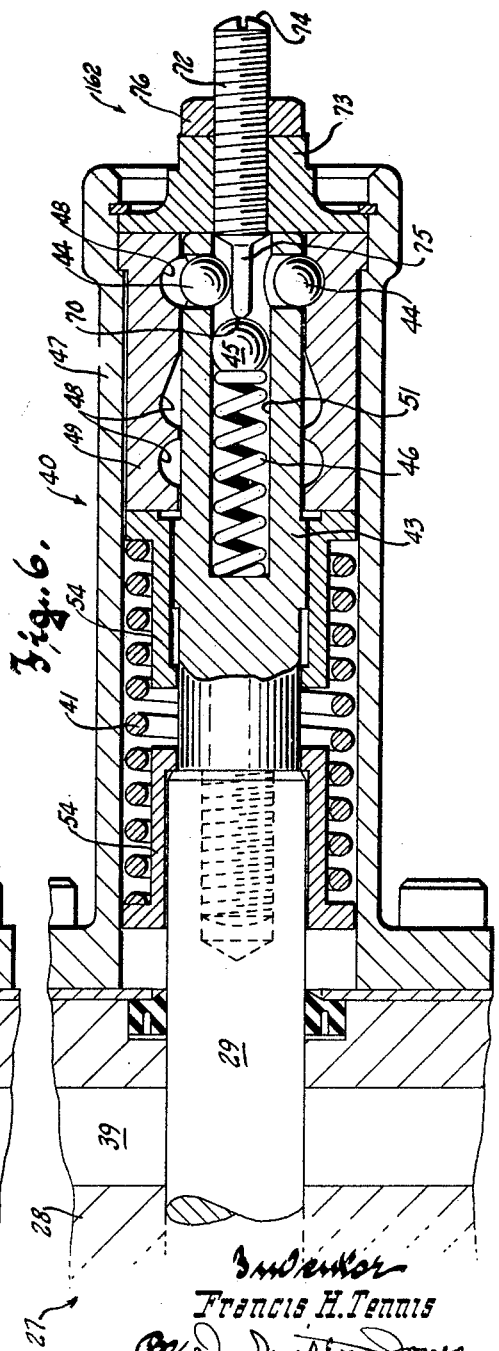

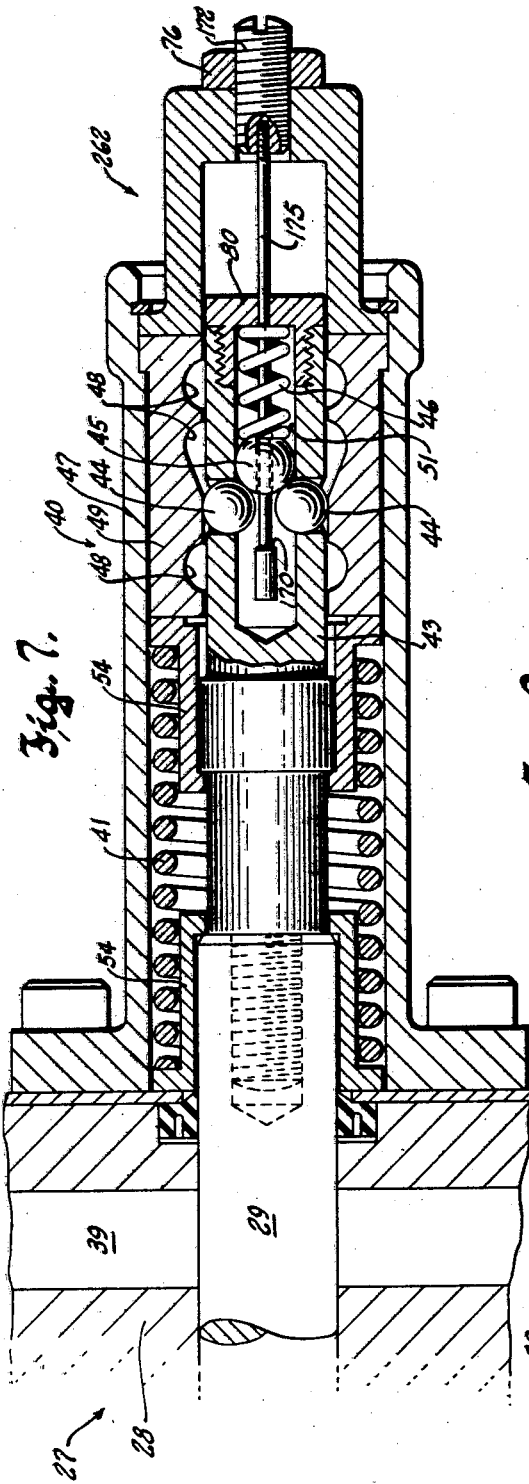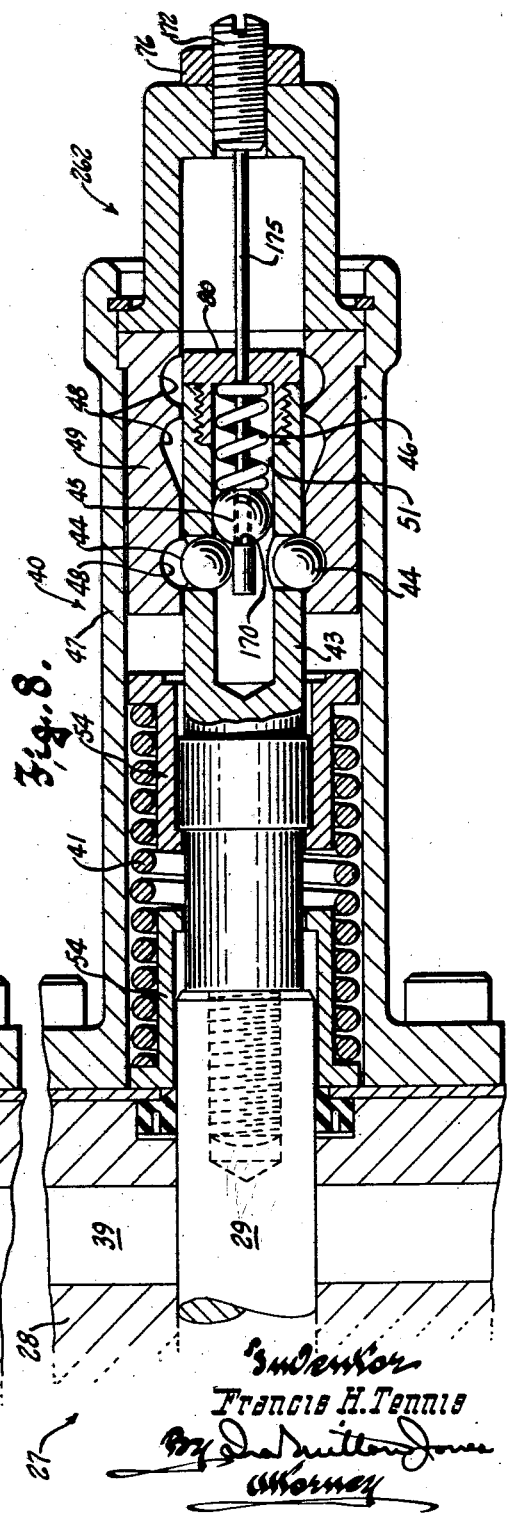

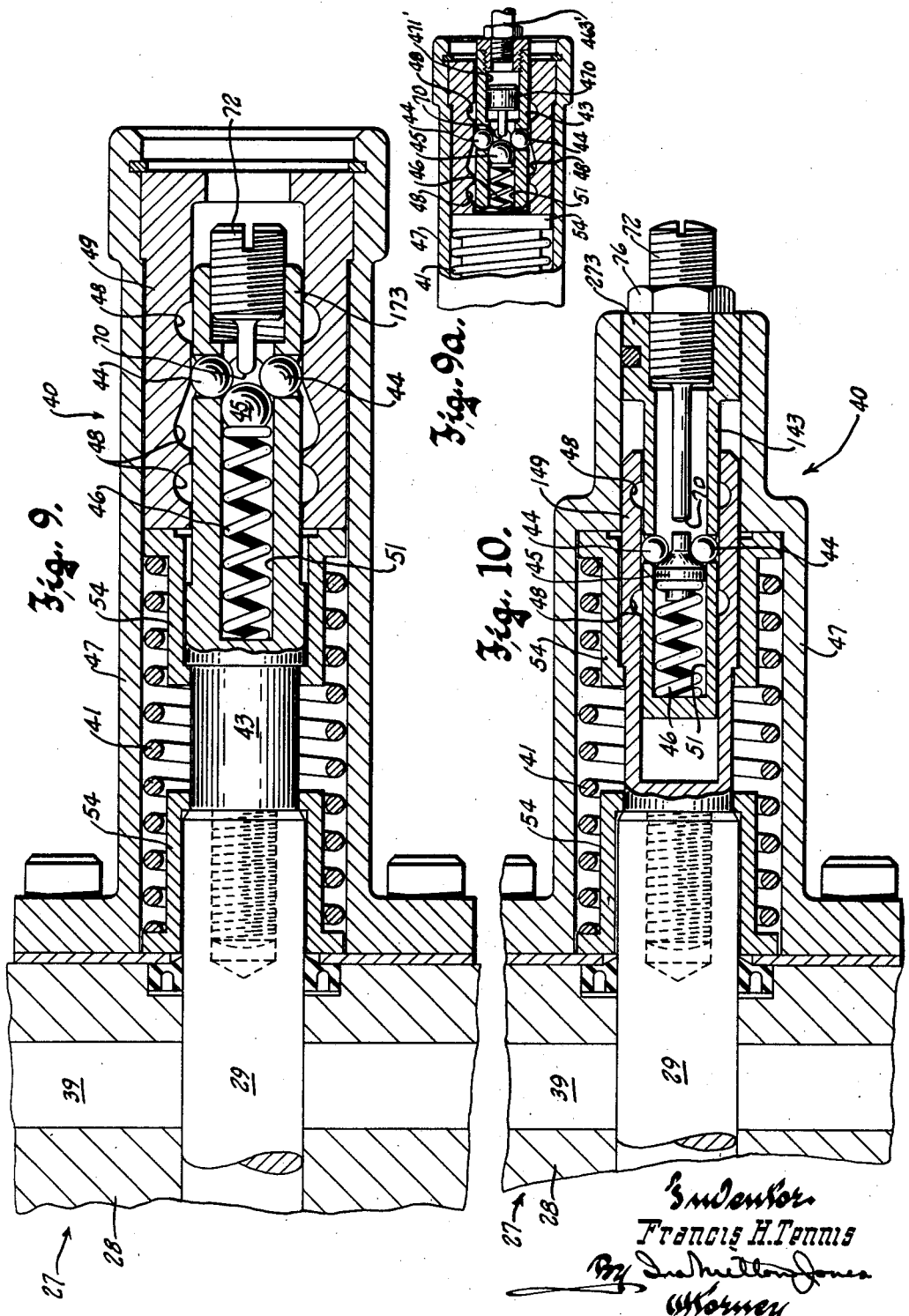

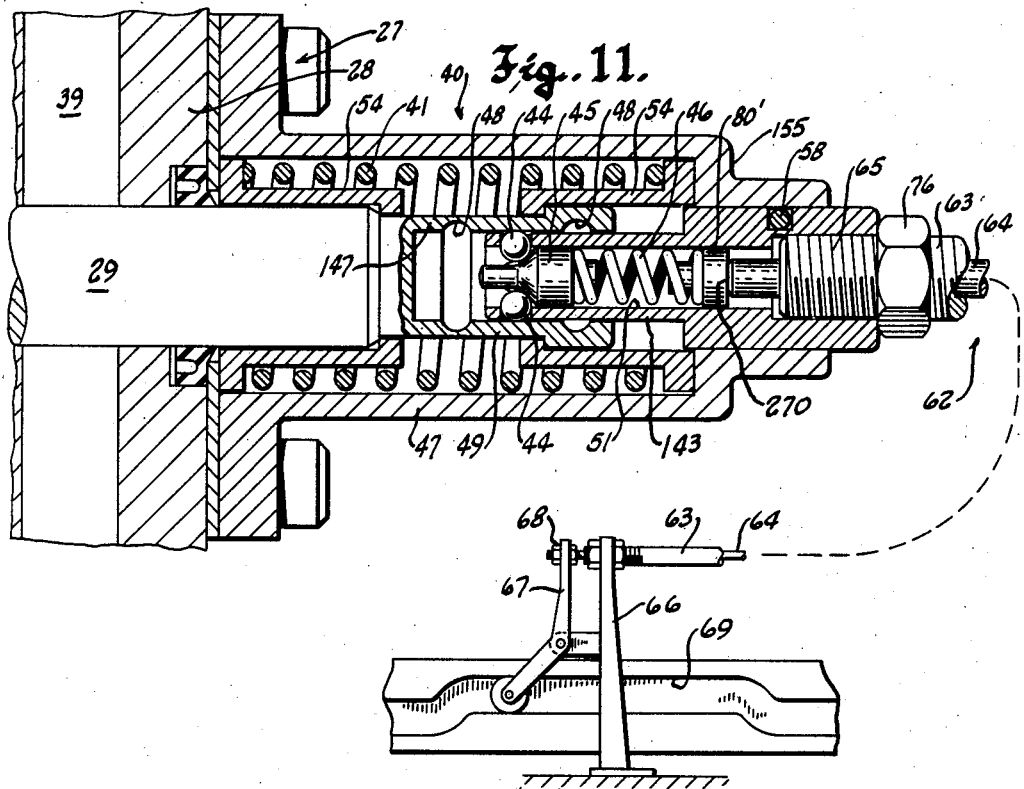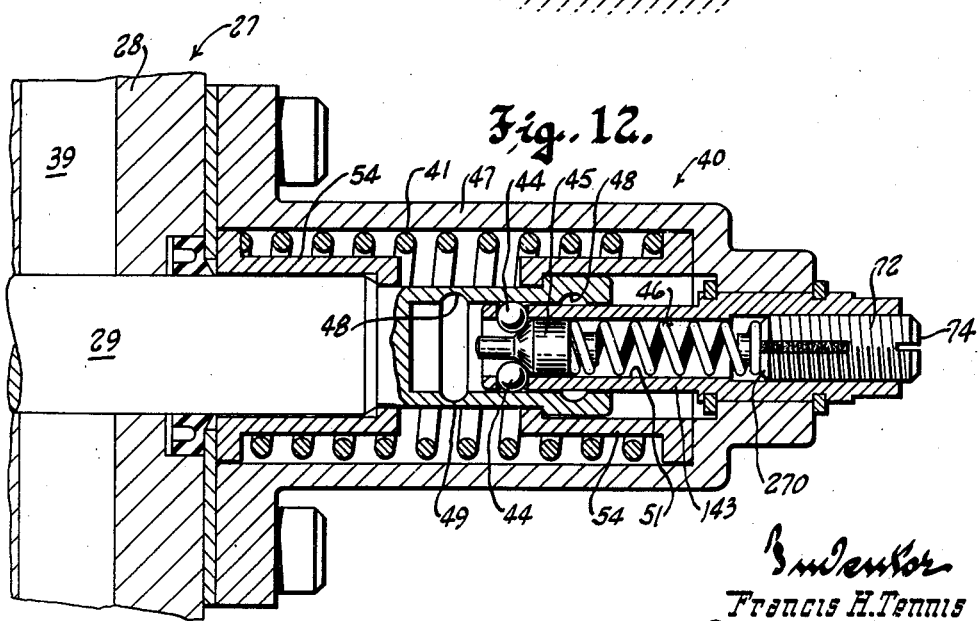

United States Patent Office 3,128,677
Patented Apr. 14, 1964

3,128,677
CONTROL INSTRUMENTALITY HAVING
DETENT MECHANISM
Francis H. Tennis, Milwaukee, Wis., assignor to
Hydraulic Unit Specialties Company, Pewaukee,
Wis.
Filed Apr. 30, 1962, Ser. No. 191,189
5 Claims. (Cl. 91—383)

This invention relates to control devices, such as manually operable control valves for hydraulic equipment, wherein a manually movable member such as a valve spool is slidable in opposite directions in a body from a neutral position to one or more predetermined operating positions; and the invention refers more particularly to control devices of that type wherein a detent mechanism is provided for defining at least one of the operating positions of the manually movable member and releasably holding said member in that position.

Detent mechanisms of the type here under consideration are illustrated in my Patent No. 2,848,014, issued August 19, 1958. They are especially useful in multi-spool valves used for controlling the several hydraulic cylinders of a hydraulic apparatus that has a number of individually operable components, and wherein each of the spools of the valve controls one of the cylinders. Any such valve spool equipped with a detent device can be held in its detent defined operating position by the device against the bias of its return spring which tends to return the spool to its neutral position, so that the operator of the apparatus need not manually hold the spool and is therefore free to use both hands for manipulating spools that control the drive cylinders for other components of the apparatus. The operator can, of course, at any time manually shift such a detent equipped spool out of its detent defined operating position for return to its neutral or "hold" position.

However, there are times when the operator may not be able to return such a detent equipped control spool to its neutral position soon enough to cause the component governed thereby to be stopped at a desired position or location, and the component overtravels before the operator can manually shift its spool back to neutral.

With this in mind, it is a purpose of this invention to provide, in a hydraulic control valve of the character described, means for automatically releasing the detent mechanism associated with a control spool of the valve in consequence of movement of the work performing element of the cylinder governed by that spool to a predetermined position which may be intermediate its extremes of motion, and which position corresponds to a desired position of the component driven by said cylinder.

As one specific example, this invention is particularly useful in the control valves used on hydraulically operated front end loaders or the like apparatus having a shovel or bucket mounted on the outer end of a boom for pivotal motion between "carry" and "dump" positions, and to an intermediate "dig" position at which the shovel is at a predetermined angle to the boom. For such apparatus, a control valve of this invention can have detent mechanism for the spool of the shovel tilt cylinder, to hold the said spool in an operating position at which it causes tilting of the shovel away from its "dump" position and toward its "carry" position during the time the operator is occupied with maneuvering the loader back to the digging location. The means to automatically disable the detent can be activated as a consequence of the shovel reaching a position that bears a predetermined angular relation to the boom and best suited for digging when the boom is lowered, normally that position of the shovel at which its bottom rests flatwise upon the ground when the boom is in a lowered position.

The invention also contemplates, as one of its objects, the provision in a hydraulic control valve having a detent defined operating position of its spool, of means for releasing the dent when a hydraulically driven component controlled by the valve (or some other hydraulic component) reaches each of a plurality of positions to which it is drivable, so that each time such component reaches one of said positions the valve spool can be automatically shifted out of its said operating position by a return spring or the like.

Another object of this invention has regard for the fact that a hydraulic control valve often has a range of metering positions through which the spool is shifted in being moved from one to the other of its operating positions, and the operator can, if he so desires, hold the spool in some portion of the metering range to permit a throttled flow of hydraulic pressure fluid to the instrumentality controlled by the valve. In this way provision can be made for operation of the controlled instrumentality at any of a number of different slow speeds, selected by positioning the spool within its metering range, and also for operation at a maximum speed which is obtained when the spool is placed all the way into a control position.

As indicated previously, it is sometimes desirable that a control position of the manually movable control spool be detent defined, and in other cases it is desirable to provide a bias on the spool which affords a "feel" that indicates to the operator the portion of the metering range in which he has disposed the spool. A machine used as both a bulldozer and an end loader is an example of an installation in which the type of control valve operation desired will vary from time to time, depending upon the accessory with which the machine is equipped. If a blade is installed on the boom of the machine for bulldozing, the operator may wish to have "feel" through the metering range of the valve that controls raising and lowering the boom and the blade thereon, so that he can readily adjust the blade height with great accuracy. When an end loader bucket is installed on the boom of the machine in place of the bulldozer blade, it is desirable that the same valve have a detent defined control position in which raising of the boom and the bucket thereon is effected. The operator can then move the control actuator to its detent-defined "raise" position and devote his full attention to maneuvering the machine into an unloading or dump position while the bucket is being raised.

It has also been found that operators vary in their preferences for hardness or softness of detent action, and that one operator may regard the detent action of a given valve as too hard while another would like a softer detent action in the same valve.

With the foregoing in mind, it is another object of this invention to provide a hydraulic control valve or the like having a manually movable control member and having a detent mechanism which can define one of the predetermined control positions of the movable member, and wherein an adjustable selector is provided which allows the detent mechanism to be disabled when desired and which then provides for the application of a biasing force to the movable member that affords a "feel" which indicates to an operator the position that the movable member occupies within its metering range.

A further object of this invention is to provide adjustment means in a hydraulic valve or the like having a detent mechanism for defining a control position of a manually movable member of the valve, by which adjustment means the detent mechanism can be partially disabled to any desired extent, to provide any desired degree of hardness of detent action within a substantially wide range, or can be disabled completely to eliminate detent action. In this connection it is also an object of this invention to provide such selector means for regulating hardness of detent action which is readily adjustable by an operator of a machine in which the valve is installed so that he can easily set the valve in accordance with his own preferences.

It is another object of this invention to provide a hydraulic control valve or similar manually operable control device having a slidable element which is movable in opposite directions to either of a pair of predetermined control positions, through a range of metering positions, which device can be adjusted to provide for either of two alternative modes of operation, in one of which one of the control positions is detent defined, with an adjustably variable degree of hardness of detent action, and in the other of which modes of operation a progressively increasing biasing force is applied to the movable element as it is moved toward said one control position, to afford a "feel" which indicates to an operator the portion of the metering range in which he has positioned the movable element.

A further object of this invention is to provide very simple means for adapting a hydraulic control valve to either of the two modes of operation just described, or for automatic release of the detent mechanism as first described, all at the option of a manufacturer of equipment or of an operator of equipment in which the control valve is installed, and which means is applicable to existing hydraulic control valves of the detent type with little or no modification of the valve itself.

Another object of this invention is to provide, in a control valve or the like having a plurality of detent defined operating positions of its spool or actuator, means for optionally disabling the detent at all of such operating positions.

Thus it is a general object of this invention to provide simple and inexpensive means, readily adaptable to a hydraulic control valve having a detent mechanism for greatly increasing the versatility of the valve so that one and the same valve can be used for installations requiring one or more detent defined control positions, installations in which a detent at one or all of the control positions is not desired, and installations where it is desired to effect automatic release of a detent mechanism when an operating device controlled by the valve reaches a predetermined position in its stroke or cycle.

It is also an object of this invention to provide mechanism of the character described that is applicable to other types of control devices having control members that are manually movable in opposite directions, such as electrical and pneumatic control devices and the like.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of physical embodiments of the invention constructed according to the best modes so far devised for the practical application of the principles thereof, and in which:

FIGURE 3 is an enlarged sectional view of the detent mechanism associated with the control spool for the shovel drive cylinder, along with the shovel cylinder actuated means for effecting disengagement of the detent at a position of the shovel that bears a predetermined angular relationship to the boom;

FIGURE 4 is a view similar to FIGURE 3, but illustrating the manner in which the detent is automatically disabled;

FIGURE 4a is a view similar to FIGURE 4 but illustrating a hydraulically operated version of the FIGURE 4 mechanism;

FIGURE 5 is a sectional view illustrating the detent and adjustable detent disabling mechanism provided for the control spool governing the boom drive cylinder, and showing the spool in its neutral position;

FIGURE 6 is a view similar to FIGURE 5, but with the spool shown in one of its predetermined control positions at which the detent would normally be engaged, and with the detent disabling means shown adjusted to its fully operative position in which it renders the detent mechanism completely ineffective;

FIGURE 7 is a sectional view similar to FIGURE 5 but showing a modified embodiment of the invention, with the spool in its neutral position and the detent disabling means in its operative position;

FIGURE 8 is a view similar to FIGURE 7 but showing the spool in the control position at which the detent mechanism would engage were it not rendered inoperative by the detent disabling means;

FIGURES 9 and 10 are sectional views similar to FIGURE 5 but showing other embodiments of manually adjustable detent disabling means embodying the principles of this invention;

FIGURE 9a is a view similar to FIGURE 9 but showing a hydraulically operated mechanism of the general type illustrated in FIGURE 9;

FIGURE 11 is a sectional view of a hydraulic control valve incorporating another form of automatic detent disabling means embodying the principles of the invention; and FIGURE 12 is a view similar to FIGURE 5 but showing still another embodiment of a manually adjustable detent disabling means.

Figure 1:
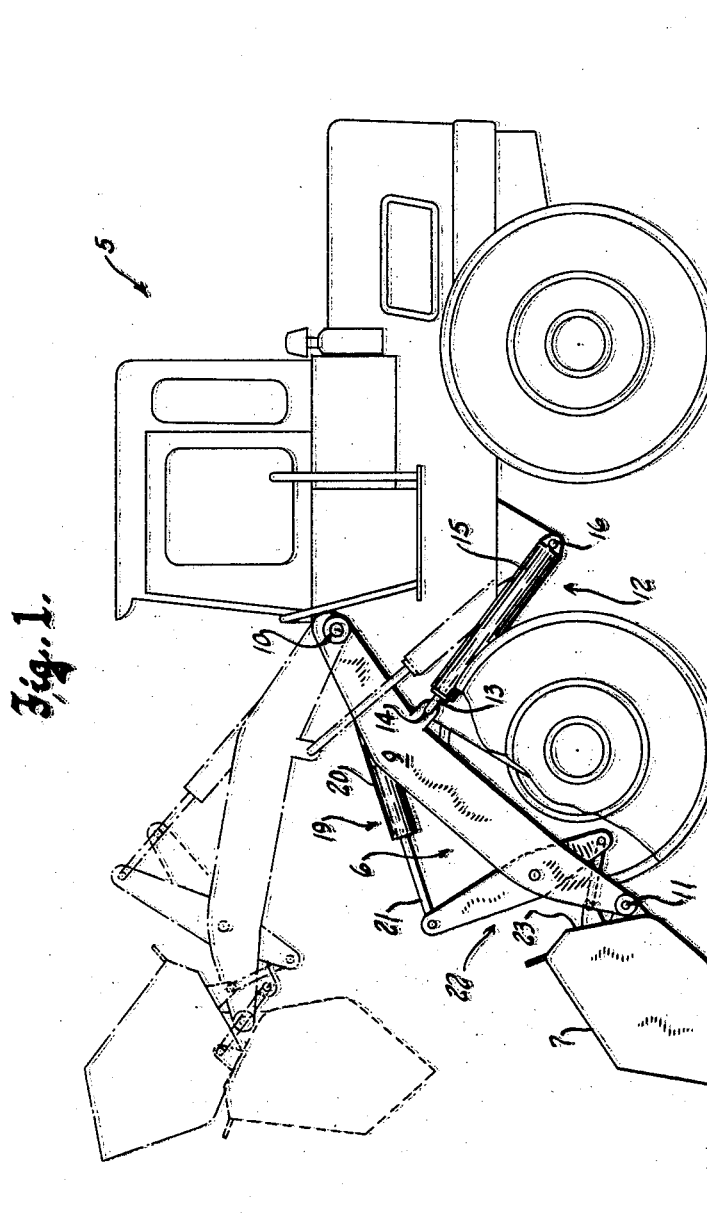
FIGURE 1 is a more or less diagrammatic side view of a front end loader, showing the relative positions of its boom and shovel during various stages of a work cycle of the loader.

Referring now more particularly to the accompanying drawings, the numeral 5 generally designates a front end loader having hydraulically operated components which include a boom structure 6, and a bucket or shovel 7 on the outer end of the boom. As is customary, the boom structure comprises a pair of opposite elongated arms 9, one at each side of the machine, having their rear ends pivotally connected to the frame of the machine as at 10 so that the arms can swing up and down in unison about a common transverse axis. The arms extend forwardly beyond the front of the loader, and the shovel 7 is pivotally connected as at 11 to the forward extremities of the boom arms for tilting motion about a transverse axis, between "carry" and "dump" positions.

Raising and lowering of the boom is effected hydraulically by a pair of double acting hydraulic operators 12, each having an extensible and retractable work performing element or ram 13 pivotally connected to one of the boom arms as at 14, and a cylinder 15 pivotally connected to the frame as at 16. Inasmuch as the two operators 12 always act in unison to effect either raising or lowering of the boom, they are customarily referred to as the boom cylinder. The boom cylinder, of course, has the usual lift and lower ports, designated 17 and 18 respectively, adjacent to its opposite ends.

Similarly, a double acting hydraulic operator 19 is provided to effect tilting of the shovel 7 between its "carry" and "dump" positions. In this case, the operator comprises a cylinder 20 having its rear pivotally connected to the boom as at 20', and an extensible and retractable work performing element or ram 21 operatively connected by a conventional link and lever system 22 to the back wall 23 of the shovel. The cylinder 20 is provided with "dump" and "carry" ports 24 and 25, respectively, at its opposite ends.

The hydraulic system for the loader includes a reservoir and a pump (not shown), driven by the engine of the machine, and a control valve 27 which may contain several axially movable control spools, each endwise slidably received in a bore in the valve body, and all manually shiftable by the operator to control the various hydraulically operated components of the machine, including the shovel actuator, the boom actuator, and, in some cases, hydraulic instrumentalities for controlling the direction of travel of the loader. Only two such spools have been shown in that portion of the valve body 28 seen in FIGURE 2, the spool 29 being that which governs the shovel cylinder 19, and the spool 30 being that which governs the boom cylinder 12.

The control valve 27 is of the type disclosed in my Patent No. 2,873,762, to which reference may be had for a more complete description of its structure and operation. It is sufficient here to note that the valve is of the "open center" type, having a through passage 32 through which pressure fluid entering the valve body from the pump flows to an outlet in the valve body that is connected to the reservoir, when all of the valve spools are in neutral positions such as occupied by the spools 29 and 30 in FIGURE 2. Shifting of any one spool axially in its bore, in either direction, blocks the through passage at its junction with the bore, and diverts high pressure fluid to each of a pair of feeder wells 34 and 35 in the body, surrounding the spool at opposite sides of the through passage 32, so as to make pressure fluid available to either of a pair of pressure chambers 36 and 37 axially adjacent to the wells 34 and 35, respectively. Shifting of the spool in one direction or the other out of its neutral position effects communication through the bore of the pressure chamber 36 with well 34 or of pressure chamber 37 with well 35.

Figure 2:
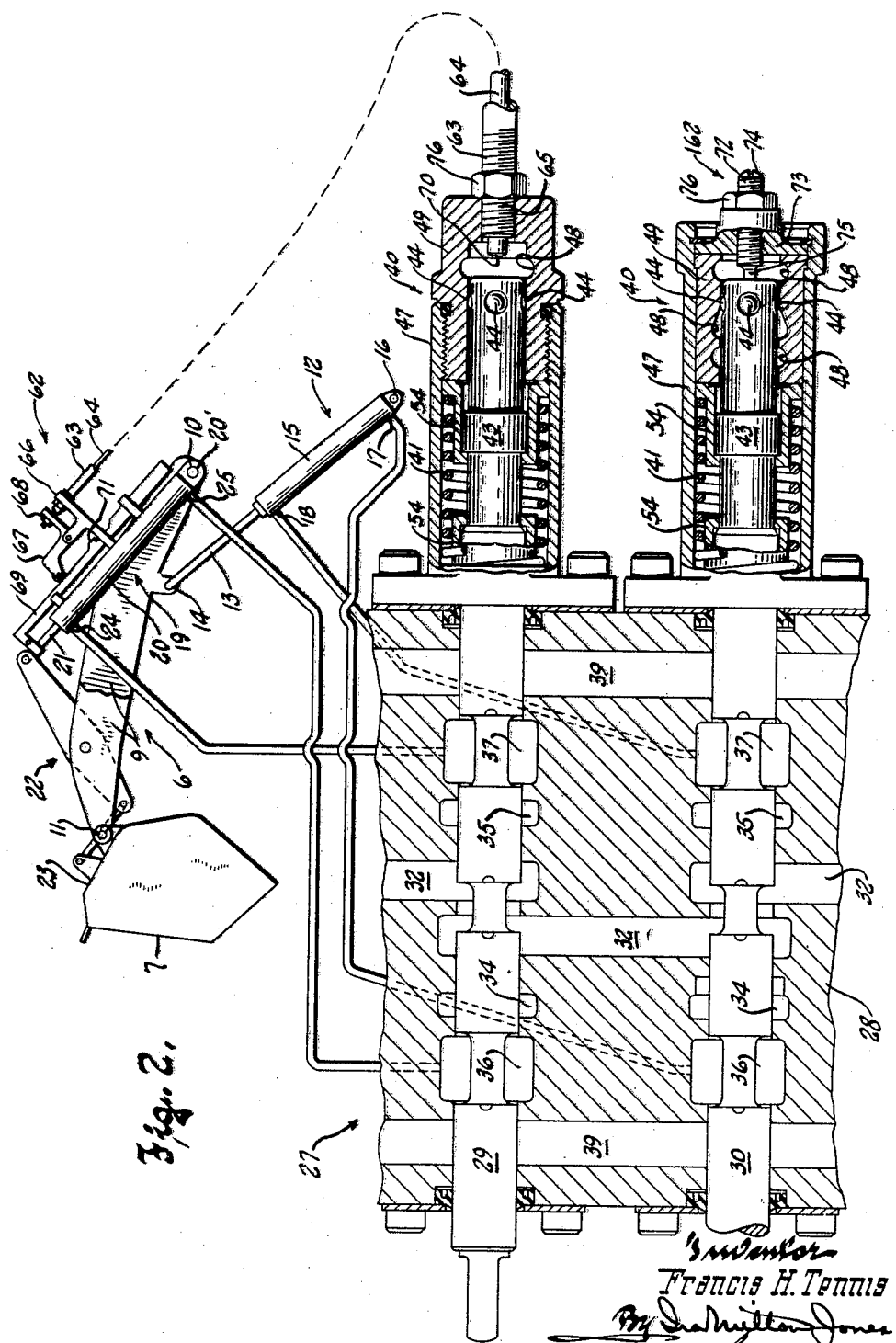
FIGURE 2 is a view more or less diagrammatically illustrating the boom and shovel drive cylinders of the loader, and that portion of the control valve of the loader which contains the control spools for the boom and shovel cylinders, the control valve being shown in longitudinal section.

The chambers 36 and 37 are communicated with the motor ports of the valve, which are in turn communicated with the ports in the cylinders. As indicated in FIGURE 2, the chambers 36 and 37 governed by the shovel control spool 29 connect with the "carry" and "dump" ports 25 and 24, respectively, of the shovel drive cylinder 19. The chambers 36 and 37 governed by the boom control spool 30 connect with the "lower" and "raise" ports 18 and 17, respectively, of the boom cylinder 12.

Consequently, if the shovel control spool 29 is shifted to the right from its neutral position shown in FIGURE 2, pressure fluid is caused to flow out of chamber 36 to the "carry" port 25 of the shovel cylinder 19; while shifting of the spool 29 to the left from its neutral position causes pressure fluid to flow out of the chamber 37 to the "dump" port 24 of the shovel cylinder 19. In each case, one of the chambers 36 or 37 is blocked off from the adjacent pressure well 34 or 35 and communicated by the spool, through the bore in which the spool operates, with an exhaust passage 39, to provide for return to the reservoir of pressure fluid exhausting from the shovel cylinder.

From the above, the operation of the boom control spool 30 is believed to be obvious, it being sufficient to note that it causes the boom to be lowered when the spool is shifted to the left, and raised when the spool is shifted to the right.

According to this invention, a detent mechanism 40 is provided for each of the spools 29 and 30, to enable the spool to be releasably held in one or more of its operating positions against the force of a centering or return spring 41 which acts upon the spool to yieldingly resist shifting thereof out of its neutral position. These detent mechanisms are substantially like those disclosed in my Patent No. 2,848,014, issued on August 19, 1958.

In general the detent mechanism for each spool comprises an inner tubular member 43 which is connected with the spool for axial motion in unison wherewith, cam follower means 44 carried by the inner tubular member and constrained to radially in and out motion relative thereto, a cam member 45 axially slidable in the inner tubular member toward and from a position in which the cam member holds the cam follower means projected outwardly of the inner tubular member, a compression spring 46 by which the cam member is biased toward said position, and an outer tubular member 47 which is fixed to the valve body and which has one or more circumferential grooves 48 in its inner surface with which the cam follower means registers in certain of the control positions of the spool. As the cam follower means comes into radial alignment with one of the grooves 48 upon motion of the spool to one of said control positions, the biasing force exerted by the compression spring 46 upon the cam member 45, and which is transmitted thereby to the cam follower means 44, causes the latter to engage in the groove with a detent action.

Specifically, the inner tubular member or detent carrier 43 can comprise an axial extension of the spool, at the end thereof remote from its manual actuator. A coaxial well 51 in the detent carrier opens to its outer end, and the compression spring 46 and cam member 45 are received in said well with a substantially free fit. The cam follower means 44 can comprise a member of satellite balls, each fitting loosely in a radial bore through the wall of the inner tubular member, the several bores containing the satellite balls having their axes in a common plane normal to the axis of the inner tubular member and located near the outer end thereof. The cam member 45 can comprise a large sun ball which is normally held engaged with the satellite balls 44 by the force of the compression spring 46, and the compression spring in turn reacts against the bottom of the well 51.

It will be observed that in the mechanism illustrated in FIGURES 2, 3, 4 and 4a, the spring 46 is located axially inwardly of the cam member 45, and the latter is in turn located axially inwardly of the cam follower balls, which thus prevent displacement of the cam member out of the well 51 in response to the biasing force of the spring 46.

The outer tubular member 47 can comprise a housing for the detent mechanism which is fixed at one end to the valve body 28 and which has an annular grooved detent element 49 coaxially fixed in its other end. In effect, therefore, the grooved detent element comprises a part of the housing and might be formed as such. Hence for all practical purposes the detent grooves 48 can be considered as formed in the outer tubular member 47. Since the inner tubular member 43 is slidably telescoped in the outer tubular member, the latter cooperates with the spool to afford guidance for the inner tubular member.

In the case of the spool 29 which governs the shovel cylinder 19, only one groove 48 is needed in the outer tubular member 47, located to be engaged by the detent balls 44 when the spool is shifted to the right from neutral, to effect tilting motion of the shovel out of its "dump" position and toward its "carry" position.

The neutral position of spool 29 is not detent defined, but instead the centering spring 41, which is housed within the outer tubular member 47 and confined between abutments on a pair of opposite abutment members 54 that have tubular portions encircled by the spring, urges the spool toward neutral whenever the satellite balls 44 are not in detent engagement with the groove 48. The centering spring coaxially surrounds the inner tubular member 43 and is axially intermediate the annular detent element 49 and the connection of the outer tubular member to the valve body.

Normally, the force which the compression spring 46 exerts upon the cam member 45, and hence upon the cam follower means 44, is sufficiently large so that the centering spring cannot effect return of the spool to its neutral position when the detent balls 44 are in detent defining engagement with the single groove 48 of the detent mechanism for the spool 29.

In the operation of a front end loader, the contents of the shovel is usually discharged while the boom is in an elevated position. The operator of the machine effects such discharge of the shovel by manually shifting spool 29 to the left, from its neutral position shown in FIGURE 2, thus causing pressure fluid to be delivered into the "dump" port 24 of the shovel cylinder 19 to effect full retraction of the ram 21. After such discharge of the load in the shovel, the operator maneuvers the loader back to the digging location, and while enroute, he may shift the boom control spool 30 to effect descent of the boom at least part way toward its normal digging position.

Both of the operator's hands are usually occupied with the task of maneuvering the machine back to the digging site, and heretofore it has not been practicable for him to bring the boom and shovel to their positions necessary to start the next digging cycle until the machine was in the proper attitude with respect to the pile of dirt or other material to be handled by the loader. After getting the machine to the proper location and position, the operator often consumed considerable time in manipulation of the shovel and boom control spools 29 and 30, to complete the lowering of the boom and the adjustment of the shovel necessary to bring it to a "dig" position with its bottom resting substantially flatwise upon the ground.

According to this invention, however, much of this time can be saved, and the digging cycle of a front end loader or similar machine can be shortened accordingly so as to increase the work output of the machine. In part this objective is achieved by the provision of the detent mechanism for the spool 29, which enables the operator to shift the shovel control spool to its detent defined position at any time after the load in the shovel is dumped and to devote his full attention to maneuvering the machine back to its digging position while the spool is held by the detent in that operative position at which it causes the shovel to be tilted away from its "dump" position and toward its "carry" position. However, it will be apparent that little time would be saved if the shovel were allowed to travel all the way to its "carry" position, as would ordinarily be the case if the detent were not released or disabled when the shovel reached its intermediate "dig" position. It is therefore another feature of this invention that return of the spool to its neutral position is effected automatically, during tilting of the shovel toward its "carry" position, by mechanism which acts upon the sun ball 45 to disable the detent action on spool 29 when the shovel reaches a "dig" position intermediate its "dump" and "carry" positions, in which the shovel is at such an angle to the boom that its bottom rests substantially flatwise upon the ground when the boom is lowered to begin the next digging cycle.

This detent disabling mechanism comprises a push pull control device 62 of the bowden wire type, having one end of its sheath 63 fixed with respect to the valve body, as at 65, in coaxial relation to and facing the open outer end of the inner tubular member or detent carrier 43, and its other end adjacent to and fixed with relation to the shovel drive cylinder 19. The cable 64 of the control device is movable in opposite directions lengthwise of its surrounding sheath, toward and from an operative position at which the cable effects engagement of an abutment 70 with the sun ball 45 of the detent mechanism for spool 29 to move the sun ball inwardly against the spring bias thereon toward disengagement from the satellite balls 44. This, of course, enables the balls 44 to move inwardly of their holes and allows the spool to be returned to its neutral position under the influence of the centering spring 41.

In order to enable such motion to be imparted to the cable 64, its sheath has one end fixed with respect to the valve body 28, in this case by having the end portion 65 of the sheath screw threaded into the outer end of the annular detent element 49, and the cable 64 projects from this end of the sheath and slightly into the open outer end of the tubular detent carrier 43. The other end of the sheath is secured to a bracket 66 that is fixed with respect to the shovel cylinder 20, which bracket also pivotally supports a bell crank 67. The adjacent end portion of the cable is connected to one end of the bell crank, as at 68, and the other end of the bell crank comprises a cam follower which is engaged with an elongated cam 69 that is lengthwise adjacent to the cylinder 20 and fixed at one end to the ram 21 to be driven endwise back and forth thereby.

During outward extension of the ram 21, to swing the bucket from its "dump" toward its "carry" position, a hump 71 on the cam engages the cam follower when the bucket reaches its "dig" position, and swings the bell crank in the direction to move the cable into its sheath. The abutment 70 on the opposite end of the cable is thereby moved axially inwardly relative to the tumbler members 43 and 47, as seen in FIGURE 4, and it moves the sun ball 45 against the force of the compression spring 46 to a position in which the cam follower means 44 is disengaged from the detent groove. In consequence of such disabling of the detent, the spool 29 can return to its neutral position under the influence of the centering spring 41, stopping further swinging of the bucket beyond its "dig" position.

Obviously, the push pull device illustrated in FIGURE 2 is merely illustrative of any of various devices by which inward movement of the abutment 70 could be effected when the shovel or bucket 7 reaches its "dig" position. FIGURE 4a illustrates a hydraulic device for effecting the same purpose wherein the abutment 70 is formed on a small piston-like plunger 470 slidable in a coaxial cylinder 471 formed in the outer end of the annular detent element 49. By means of a suitable duct 463 the interior of the cylinder is communicated with a plunger pump (not shown) of a type that will be obvious to those skilled in the art, arranged to be actuated by the cam 69. The hump 71 on the cam actuates the pump to pressurize fluid in the duct 463 and cylinder 471, to thus move the plunger 470 inwardly to its detent releasing position shown in FIGURE 4a.

Other suitable mechanical, hydraulic and electrical devices that effect the same purpose in consequence of movement of the ram 21 of cylinder 19 to a predetermined position will readily occur to those skilled in the art. It will also be apparent that the cam 69 could provide for detent release at any one of a number of different positions of the bucket, or in response to the position of some other member by which the cam 69 might be actuated.

The detent mechanism associated with the spool 30 which effects control of the boom (best seen in FIGURES 5 and 6) has three grooves 48 in its outer tubular member 47, and thus provides three detent defined positions of the spool. However, the central one of the three grooves, which defines the control position in which pressure fluid from the through passage 32 flows to the "boom lower" pressure chamber 37, has a gradual taper from its bottom toward the neutral position, so that it does not afford a pronounced detent action as the spool is moved to the left from neutral. Instead, the camming effect which the satellite balls 44 exert against this tapering portion of the groove, under the influence of compression spring 46, tends to overcome the biasing force exerted by the centering spring 41, although it does not do so completely. Hence as the operator moves the spool to the left from the neutral position he feels a gradually increasing but relatively light bias force resisting such movement, until the cam follower means registers with the bottom of the central groove 48; and thereafter a substantially greater force is required to move the spool farther toward the left, to carry the balls 44 out of the central groove 48 with a detent action and overcome the force exerted by the centering spring as the spool is moved to a "float" position. At the float position the cam follower balls of course enter the left hand groove 48 with a detent action.

When the spool is moved to the right from its neutral position, against the force of the centering spring, the cam follower balls 44 normally enter the right-hand groove 48 with a marked detent action that sharply defines the right-hand control position of the spool; but a detent disabling means designated generally by 162 can be suitably adjusted to cause this detent action to have any desired degree of hardness, or to so disable the detent mechanism as to eliminate detent action in the right-hand control position of the spool.

The detent disabling means 162 operates in a manner generally similar to the push pull detent disabling device 62 previously described, but comprises an adjusting screw 72 concentrically threaded into a part 73 that is axially fixed within the outer tubular member 47 at its open outer end, and coaxial with the latter. The screw 72 has a head 74 which is accessible at the exterior of the body for adjustment by means of a screwdriver or the like, and has a rod-like inner portion 75 that terminates at its inner end in an abutment 70 which faces the cam member 45 at the side thereof that is axially remote from the compression spring 46. Preferably the part 73 in which the adjusting screw portion of the detent disabling means is carried comprises a nut-like member having an annular flange to fit a counterbore in the outer end of the member and hold a shoulder on the end of the annular detent element 49 against the bottom of the counterbore. A spring ring snapped into a groove in the wall of the counterbore holds the nut-like member against outward displacement. The nut-like member may have opposite flats on its body accessible at the exterior of the assembly and to which a wrench may be applied while a lock nut 76 threaded over the screw 72 is tightened against the outer face of the member 73 to hold the screw in any position of axial adjustment.

In its inoperative position the abutment 70 on the detent disabling means is located sufficiently far to the right of its position shown in FIGURES 5 and 6 so that it is never engaged by the cam ball 45, and consequently the detent mechanism makes normal detent engagement with the right hand groove 48.

When the detent disabling means is screwed inwardly to its fully operative position shown in FIGURES 5 and 6, the abutment 70 thereon engages the cam ball 45 after the spool has been moved a small distance to the right from its neutral position, holding the cam ball against movement in response to the bias of the compression spring 46. Under these conditions the satellite balls 44 can not engage in the right hand detent groove 48 under spring bias, and consequently there is no detent indication of arrival of the spool at its right hand control position.

However the force of the compression spring 46 is now transferred to the detent disabling means through the cam ball 45, so that the compression spring in effect reacts between the valve body and the spool. Hence the compression spring 46 imposes upon the spool a biasing force which supplements that of the centering spring 41 and which progressively increases as the spool is moved through its metering range toward its right hand control position, thus giving the operator a "feel" which is proportional to the flow rate of pressure fluid to the "boom raise" pressure chamber 36. It will be noted that the rod-like inner portion 75 of the detent disabling member holds the satellite balls 44 against radially inward displacement to the point where they would be out of the transverse bores in the inner tubular member in which they are confined.

In intermediate positions of adjustment of the detent disabling member its abutment 70 engages the cam ball 45 only as the spool is being moved through the last small part of its travel toward the right hand control position, thus preventing the compression spring 46 from driving the satellite balls 44 all the way outwardly to the bottom of the groove, and correspondingly softening the detent action. By suitable adjustment of the screw 72 the detent action can be made so light that it is incapable of resisting the force of the centering spring, and merely serves to apprise the operator that the spool has reached its right hand control position.

In the modified embodiment of the invention illustrated in FIGURES 7 and 8 the detent disabling means 262 prevents full detent engagement of the satellite balls 44 in the left hand groove 48 of the outer tubular member. In this case the central groove 48 tapers away from the neutral position to provide a metering "feel" as the spool is moved to the right from neutral, and the right hand groove 48, with which the satellite balls always make detent engagement, defines a "float" position. The satellite balls are of course disposed intermediate the left-hand and center grooves when the spool is in its neutral position, illustrated in FIGURE 7.

The compression spring 46 reacts against a plug 80 which is threaded or otherwise secured in the outer end of the inner tubular member to close the mouth of the well 51 therein, and hence said spring and the cam member 45 are located at the axially outer side of the satellite balls 44, the cam member 45 however being again confined between the compression spring and the satellite balls.

The detent disabling means 262 comprises a set screw 172 to which is secured a rod-like extension 175 that projects axially inwardly through bores in the plug 80 and in the cam member 45, and which has an enlarged head at its inner end that provides an axially outwardly facing abutment 170 engageable by the cam member 45.

While the abutment 170 in the FIGURES 7 and 8 embodiment of the invention faces outwardly, it will be obvious that it cooperates with the cam member 45 in a manner similar to the functioning of the abutment 70 in the FIGURES 5 and 6 versions of the invention, except that it is inoperative in its axially innermost position and effects augmentation of the biasing force of the centering spring when in an axially outermost position. In intermediate positions it of course prevents the satellite balls from fully bottoming in the left-hand groove 48, affording a soft detent action.

The embodiment of the invention illustrated in FIGURE 9 is similar in most respects to that of FIGURES 5 and 6, but differs therefrom in that the detent action can be disabled or adjusted as to hardness in all of the detent defined positions of the manually movable member, and not merely in one of them. This results from the fact that the part 173 that carries the detent disabling adjusting screw 72 is connected to the inner tubular member or detent carrier 43 for axial motion therewith. Hence when the adjusting screw 72 is set in a position at which the abutment 70 at its inner end is engaged with the cam member or sun ball 45, it maintains such engagement in all positions of the inner tubular member 43. By proper adjustment of the screw 72, the mechanism shown in FIGURE 9, like that of FIGURES 5–8, can be set to provide either a more or less soft detent action or a complete disabling of detent action.

A detent device of the type shown in FIGURE 9 is advantageous because the purchaser of a valve or other manually operable control device having such a mechanism installed therein acquires a very versatile standard item, adjustable to provide the desired type of operation with only a few turns of a screw driver. The detent mechanism and its disabling means are relatively inexpensive and hence manufacturers of hydraulic equipment and the like need carry an inventory of only one type of valve to satisfy all requirements. The inventory problems of dealers in repair and replacement parts are similiarly simplified.

The mechanism illustrated in FIGURE 9a is similar to that of FIGURE 9 in many respects, and likewise provides for detent release in any position of the spool, but provides for effecting such release automatically when an instrumentality controlled by the spool reaches a predetermined position. As in the case of the embodiment of the invention illustrated in FIGURE 4a the abutment 70 which engages the cam member or sun ball 45 is formed on the inner end of a piston-like plunger 470, slidable in a cylinder 471' which is in this instance formed in the inner tubular member or detent carrier 43. A duct 463' by which the cylinder 471' is communicated with a plunger pump (not shown) or the like is flexible to accommodate axial motion of the detent carrier, and provision is of course made for pressurizing fluid in the duct 463' and cylinder 471' when a controlled instrumentality reaches a predetermined position, to effect inward detent disabling movement of the plunger 470.

The mechanism illustrated in FIGURE 10 is similar to that of FIGURE 9 in that it provides for adjustment of detent action in all detent defined positions of the control device on which the mechanism is installed, to afford a more or less soft detent action in every detent defined position or to completely disable the detent action. In this instance the inner tubular member 143, in which are confined the cam follower means or satellite balls 44, is fixed with respect to the valve body, being connected to the detent mechanism housing at the end thereof opposite the valve body, while the outer tubular member 149, in which are located the inwardly opening detent grooves 48, is movable with the valve spool. This is of course a mere reversal of the relationship of the tubular members 43 and 49 in the previously described embodiments of the invention, and is its full mechanical equivalent. The centering spring 41 obviously reacts between abutments fixed with respect to the valve body and other abutments on the outer tubular member 149. The part 273 that carries the detent adjusting screw 72 can comprise an extension of the stationary inner tubular member having a threaded coaxial bore in which the adjusting screw is received. The operation of the detent adjusting means shown in FIGURE 10 is identical with that of FIGURE 9, and in view of the mechanical equivalence of the two mechanisms requires no explanation.

In the embodiment of the invention illustrated in FIGURE 11 the detent mechanism is again associated with a hydraulic control valve and is the type which is released when mechanism governed by the control valve reaches a predetermined position. The movable part comprising the detent disabling means 62 can comprise a push pull cable or Bowden wire which cooperates with a cam 69 that is moved by the controlled mechanism, as in the embodiment of the invention illustrated in FIGURES 2, 3 and 4.

As in the FIGURE 10 embodiment, the inner tubular member or detent carrier 143 is fixed with respect to the valve body, being secured to the outer tubular housing 155 near the end thereof remote from the valve body; and the grooved annular detent element 49 comprises a movable outer tubular member 147 that is connected to the valve spool for motion therewith. To facilitate manufacture and assembly, the inner tubular member can fit somewhat loosely in the housing, so that it can readily assume coaxiality with the outer tubular member 147 on the valve spool, and it is held against axial and rotary movement relative to the housing by means of a loosely fitting cross pin 58. The detent disabling means 62 is held coaxial with the telescoped tubular members by the externally threaded end 65 of the sheath in which the cable is enclosed and which is screwed into the outer end of the fixed inner tubular member.

In this instance the abutment 270 on the detent mechanism end of the cable bears against a seat 80' for the detent spring 46, which is disposed axially outwardly of the cam member 45 of the detent mechanism. The cam 69 on the controlled mechanism moves the cable between a detent disabling position and a detent enabling position, and in the former the abutment 270 on the cable is axially outwardly of the location it occupies when the cable is in its detent enabling position. Hence in the detent disabling position of the abutment 270 a substantial portion of the biasing force of the detent spring 46 is relieved, permitting the centering spring 41 to overcome the holding action of the satellite balls 44. In its detent enabling position the abutment 270 of course loads the detent spring so that it can effect the usual detent activating biasing force.

The embodiment of the invention illustrated in FIGURE 12 is essentially similar to that shown in FIGURE 11 except that the abutment 270 provides the seat for the detent spring 46 and comprises the axially inner end of a manually adjustable screw 72, which is here shown as of a self-locking type, having an outer end 74 which is accessible at the exterior of the detent mechanism. The structure shown in FIGURE 12 is particularly useful where adjustability of the hardness of detent action is primarily desired, although it of course achieves the feature of completely disabling the detent action when the detent disabling means comprising the screw 72 is adjusted outwardly to relieve the loading on the detent spring.

From the foregoing description taken together with the accompanying drawings it will be apparent that this invention provides an adjustable detent disabling means for a hydraulic control valve or the like, adaptable to conventional control valves equipped with detent mechanisms without requiring more than slight modification thereof, and capable of affording either a normal hard detent action in one or all of the control positions of the valve spool, or a detent action in said position or positions having any desired degree of softness, or a biasing force upon the valve spool which affords a metering "feel" as the valve spool is moved toward said one control position, by which the operator is apprised of the position that the spool occupies within its metering range. It will also be apparent that the invention provides means for disabling detent action of a control instrumentality when a mechanism controlled by the instrumentality reaches a predetermined point in its operating cycle or stroke.

What is claimed as my invention is:

1. In a hydraulic control valve or the like having a manually movable member slidable in a body in opposite directions through a range of metering positions to one or the other of a pair of control positions:
 (A) a pair of tubular members assembled in telescoping relation,
  (1) one of said tubular members being connected to the manually movable member for axial motion in unison therewith, and the other of said tubular members being fixed, and
  (2) the outer one of said tubular members having an inwardly opening depression;
 (B) cam follower means carried by the inner tubular member and constrained to radial in and out motion relative thereto;
 (C) a cam member cooperable with the cam follower means and movable axially back and forth relative to the inner tubular member, toward and from a position in which the cam member holds the cam follower means projected radially outwardly from the inner tubular member;
 (D) a compression spring reacting between the inner tubular member and the cam member to bias the latter toward said one position and thus exert through the cam member a radially outward bias upon the cam follower means by which the latter can be urged into detent defining engagement in said depression in the outer tubular member when the manually movable member is in one of its operating positions; and (E) a detent disabling element coaxially mounted on a part fixed with respect to one of the tubular members and having an abutment at its inner end which faces the side of the cam member that is axially remote from the compression spring, said detent disabling element being coaxially movable relative to the valve body between a first position in which said abutment is at all times clear of the cam member so that the full force of the compression spring is transmitted through the cam member to the cam follower means to provide detent action, and a second position at which said abutment engages the cam member when the movable member is in said one position thereof and opposes the bias of the compression spring upon the cam member.

2. In a control device having a manually movable member slidable in opposite directions in a body through a metering range and to each of a pair of predetermined positions:
(A) a tubular detent carrier connected with the movable member for motion in unison therewith;
(B) a cam element axially slidable in the detent carrier;
(C) a compression spring reacting between the detent carrier and the cam element to bias the latter in one axial direction;
(D) cam follower means constrained to radially in and out motion relative to the detent carrier, said cam follower means being engageable by the cam element to be urged radially outwardly relative to the detent carrier under the influence of the force exerted upon the cam element by the compression spring;
(E) an outer tubular member fixed to the body coaxially with the detent carrier and having an inwardly opening depression which registers with the cam follower means in one of said predetermined positions of the manually movable member and in which the cam follower means is engageable with a detent action under the force of the compression spring; and
(F) selector means for optionally preventing detent engagement of the cam follower means in said depression and instead providing progressively increasing bias upon the movable member as it is moved through the other of said predetermined positions, to enable an operator to ascertain, by feel, the portion of the metering range to which the movable member has been moved, said selector means comprising
  (1) a detent disabling member having an abutment thereon which faces the cam element at the side thereof axially remote from the compression spring, and
  (2) means for adjustably fixing the detent disabling member to the body in an inoperative position in which said abutment is at all times clear of the cam member and thus allows normal detent opeartion, or in an operative position in which the abutment is so disposed as to be engaged by the cam element as the movable member is moved through the metering range toward said one position, to receive the force of the compression spring and cause it to react against the movable member to urge the same away from said one position.

3. A detent device comprising:
(A) a pair of telescoped members, one of which is fixed and the other of which is axially movable relative to the first;
(B) means on one end of the fixed telescoped member for attaching the device to apparatus to be controlled thereby, so that access to said end of the device is blocked;
(C) means for defining a predetermined position of the relatively movable telescoped member and for releasably holding the same therein, comprising
  (1) interengageable detent elements carried by the telescoped members, and
  (2) biasing means comprising a spring for yieldingly urging said detent elements into detent defining interengagement when the movable telescoped member is in said predetermined position thereof; and
(D) detent control means comprising
  (1) a movable part independent of said detent elements,
  (2) means fixed with respect to one of the telescoped members, at the other end thereof, mounting said movable part for motion coaxially of and relative to the movable telescoped member, and relative to the detent elements, between detent enabling and detent disabling positions,
  (3) an abutment on the movable part operatively associated with said biasing means to render the same effective to urge the detent elements into interengagement in the detent enabling position of the movable part, and to render the biasing means ineffective to hold the detent elements interengaged in the detent disabling position of the movable part, and
  (4) actuating means operatively connected with the movable part adjacent to said other end of the device, and at all times accessible for actuation from the exterior of the device, for effecting movement of said movable part toward and from each of its said positions.

4. In a control device:
(A) a control member which is manually movable in opposite directions to and from a predetermined position;
(B) a stationary tubular member;
(C) a movable tubular member concentrically encircled by the stationary tubular member and constrained to axial movement thereby;
(D) means providing a motion transmitting connection between the control member and said movable tubular member at one end of the assembly provided by said telescoped tubular members, whereby the movable tubular member moves in unison with the control member;
(E) means to define and yieldingly hold the control member in said predetermined position, comprising
  (1) interengageable detent elements carrier by the tubular members,
  (2) a spring in the inner tubular member to yieldingly hold said detent elements interengaged when the control member is in said predetermined position thereof, and
  (3) a cam in the inner tubular member acted upon by said spring and through which the force of the spring is transmitted to the detent elements, said cam being movable counter to the bias of the spring to effect disabling of the detent elements;
(F) a detent disabling element;
(G) means at the other end of the assembly provided by said telescoped tubular members providing a screw threaded connection between one of the tubular members and the detent disabling element whereby the detent disabling element is mounted for adjusting movement coaxially of and relative to the inner tubular member, toward and from a position at which the detent disabling element is engageable with the cam to relieve the detent elements of the bias of said spring; and
(H) means connected with the detent disabling element and actuatable from the exterior of said assembly for adjustingly moving the detent disabling element toward and from its said position.

5. In combination:
(A) power means;
(B) an actuator driven by said power means;
(C) control means for said power means comprising
   (1) a fixed element and
   (2) a manually operable element which is movable relative to the fixed element in opposite directions to and from a predetermined position at which the movable control element is adapted to effect operation of the power means;
(D) biasing means acting upon the movable control element to yieldingly resist movement thereof to said predetermined position;
(E) means to define and yieldingly hold the movable control element in said predetermined position thereof against the force exerted thereon by said biasing means, said last named means comprising
   (1) a detent member carried by one of said elements and movable relative to the element by which it is carried toward and from a detent defining position of engagement in a groove in the other element, with which groove the detent member registers when the movable element is in its said predetermined position, and
   (2) a spring for urging said detent member toward its detent defining position;
(F) detent control means comprising
   (1) a movable part independent of the detent member,
   (2) means fixed with respect to one of said elements mounting said movable part thereon for motion relative to said element and to the detent member between detent enabling and detent disabling positions, the movable part being clear of the detent member in its said detent enabling position.
   (3) an abutment on the movable part operatively associated with said spring to render the same effective to urge the detent member toward its detent defining position in the detent enabling position of the movable part and to render the spring ineffective to hold the detent member in its detent defining position in the detent disabling position of the movable part; and
(G) means operated by said actuator for moving said movable part to its detent disabling position in consequence of movement of said actuator to a predetermined position.

References Cited in the file of this patent
UNITED STATES PATENTS

| | | |
|---|---|---|
| 2,848,014 | Tennis | Aug. 19, 1958 |
| 2,874,720 | Vahs | Feb. 24, 1959 |
| 3,040,772 | Todd | June 26, 1962 |
| 3,088,489 | Stacey | May 7, 1963 |